United States Patent [19]

Suplinskas et al.

[11] Patent Number: 4,481,257
[45] Date of Patent: Nov. 6, 1984

[54] BORON COATED SILICON CARBIDE FILAMENTS

[75] Inventors: Raymond J. Suplinskas, Haverhill; Albert W. Hauze, Chelmsford, both of Mass.

[73] Assignee: Avco Corporation, Wilmington, Mass.

[21] Appl. No.: 505,567

[22] Filed: Jun. 17, 1983

Related U.S. Application Data

[63] Continuation of Ser. No. 97,469, Nov. 26, 1979, abandoned.

[51] Int. Cl.$^3$ ............................................. D02G 3/00
[52] U.S. Cl. ................................ 428/366; 427/255; 428/375
[58] Field of Search ............... 428/375, 366; 427/255

[56] References Cited

U.S. PATENT DOCUMENTS

| | | | |
|---|---|---|---|
| 3,811,940 | 5/1974 | Douglas et al. | 428/366 X |
| 4,068,037 | 1/1978 | Debolt et al. | 427/255 X |

Primary Examiner—Lorraine T. Kendell
Attorney, Agent, or Firm—Abraham Ogman

[57] ABSTRACT

Silicon carbide filament is produced by overcoating a carbon monofilament core using continuous process vapor deposition. The deposition takes place by passing the carbon monofilament through a reactor into which gaseous sources of silicon and carbon are injected. At a deposition temperature of about 2370° F., a deposit of fine grained beta crystals of silicon carbide are formed. Application of a thin protective coating of boron-based refractory material on the surface of the silicon carbide filament both adds strength and provides a surface which is readily bonded to both metals and epoxy matrix materials during the casting of composite structures.

10 Claims, 2 Drawing Figures

BORON COATED SILICON CARBIDE FILAMENTS

This is a continuation of application Ser. No. 097,469 filed Nov. 26, 1979 and now abandoned.

BACKGROUND OF THE INVENTION

For purposes of this application, the term "boronic" shall mean the element boron or a composition containing boron.

Many composite materials are being reinforced with high strength, high modulus filaments such as boron or silicon carbide. The composite matrix materials provide high strength and stiffness while at the same time give reduced component weight.

U.S. Pat. No. 4,068,037 to DeBolt et al and assigned to the same assignee as this invention discloses means for making silicon carbide filament. In accordance with the DeBolt et al patent, a carbon filament is drawn from a supply reel and passed through a reactor chamber comprised generally of a closed tubular cylinder having oppositely disposed closed ends. In each of the closed ends, there is a central aperture which allows the carbon filament to pass into and out of the reactor on an uninterrupted basis. A mercury contact in each aperture allows that portion of the filament which is within the reactor to be raised in temperature by resistance heating. A number of ports in the sidewalls of the reactor tube allow chemicals to be injected into and withdrawn from the reactor chamber. Typically, a mixture of hydrogen and silanes are fed into the tubular cylinder to deposit silicon carbide. When the silanes come in contact with the heated filament core, a chemical vapor deposition process takes place, and silicon carbide is deposited on the core.

DeBolt et al further teaches that it is advantageous to apply a surface layer of carbon-rich silicon carbide to the silicon carbide coating during the deposition process. The carbon-rich layer was shown to both improve tensile strength and decrease sensitivity to surface abrasion. The layer was approximately one micron thick and had a chemical composition which varied from pure carbon at the outer surface to silicon carbide at a depth of one micron. This carbon-rich coating both enhanced the strength of the filament and at the same time made the filaments easier to handle by the operator.

The carbon-rich filament of DeBolt et al does exhibit certain deficiencies. For example, when the filaments are fabricated into an aluminum composite, they do not wet easily in molten aluminum. Wetting can be accomplished at very high temperatures, but this degrades the strength of the filaments, presumably by chemical reaction between the aluminum and the carbonaceous surface. Aluminum alloys containing magnesium, nickel or titanium wet the filament at lower temperatures, but degrade their strength by chemical attack. In aluminum composites fabricated at lower temperatures, for example, by diffusion bonding, there is poor bonding between the filament and the matrix. In composites where the matrix material is titanium, the properties of the composite suffer because of mutually adverse interaction between the filament and the matrix. In matrix materials such as epoxy resins, it has also been difficult to provide good bonding between the carbonaceous surface and the resin.

With our invention, these problems are corrected. We apply boronic refractory material coatings such as boron or boron carbide to the silicon carbide filament preferably by chemical deposition. The boronic refractory material coatings provide protection from chemical attack of the filament by matrix materials during processing, fabrication and high temperature use. A thin outer boronic layer in the order of 1 micron or less may be used to enhance wetting and bonding of the filament to the matrix material. Heavier coatings would have the same effect, but is not preferred because heavier coatings take longer to produce. Heavier coatings are used to protect the silicon carbide from attack by the matrix material when the silicon carbide is used to make a composite material. Tests show that it does not seriously effect the strength of the underlying silicon carbide filament. Addition of the boronic refractory material coatings may be used to enhance the strength of the resulting filament.

The boronic refractory material coatings may be applied either directly to the silicon carbide or to a silicon carbide filament which has a carbonaceous outer skin. The methods and conditions under which the coatings are applied are unique to this invention.

SUMMARY OF THE INVENTION

In the present invention, boron-based refractory material coatings are applied on silicon carbide filament by chemical vapor deposition. The silicon carbide filament may be produced by the method taught by DeBolt et al. The coatings are applied by passing the silicon carbide filament through a chemical vapor deposition reactor. The filament to be coated is passed through the reactor continuously from a feed reel to a take-up spool. That portion of the filament which is within the reactor is heated to an appropriate temperature somewhere between 1400° F. and 2550° F. The preferred range for depositing boron is 1400° F. to 1500° F., while 1800° F. to 2550° F. is preferred for boron carbide. Reactant gases are admitted to and passed through the reactor. Temperature and resident time of the filament within the reactor determines coating thickness.

The coatings may range in thickness from approximately 9 microns down to less than 0.1 micron. The optimum thickness may vary with the coating, the intended matrix material, and with the composite fabrication procedure. For example, the optimum boron coating for use in an epoxy matrix is less than 0.1 micron thick for wetting the filament to the epoxy. The optimum range boron carbide coating for subsequently casting the filament in aluminum and subject to exposure to high temperatures for short times is approximately 0.2–1 micron. For other processing methods, such as diffusion bonding or hot molding, thicker coatings, for example, 6–9 microns, appear optimum.

The novel features that are considered characteristic of the invention are set forth in the appended claims. The invention itself, however, both as to its organization and method of operation, together with additional objects and advantages thereof, will best be understood from the following description of a specific embodiment.

DESCRIPTION OF THE PREFERRED EMBODIMENT

Figure 1:
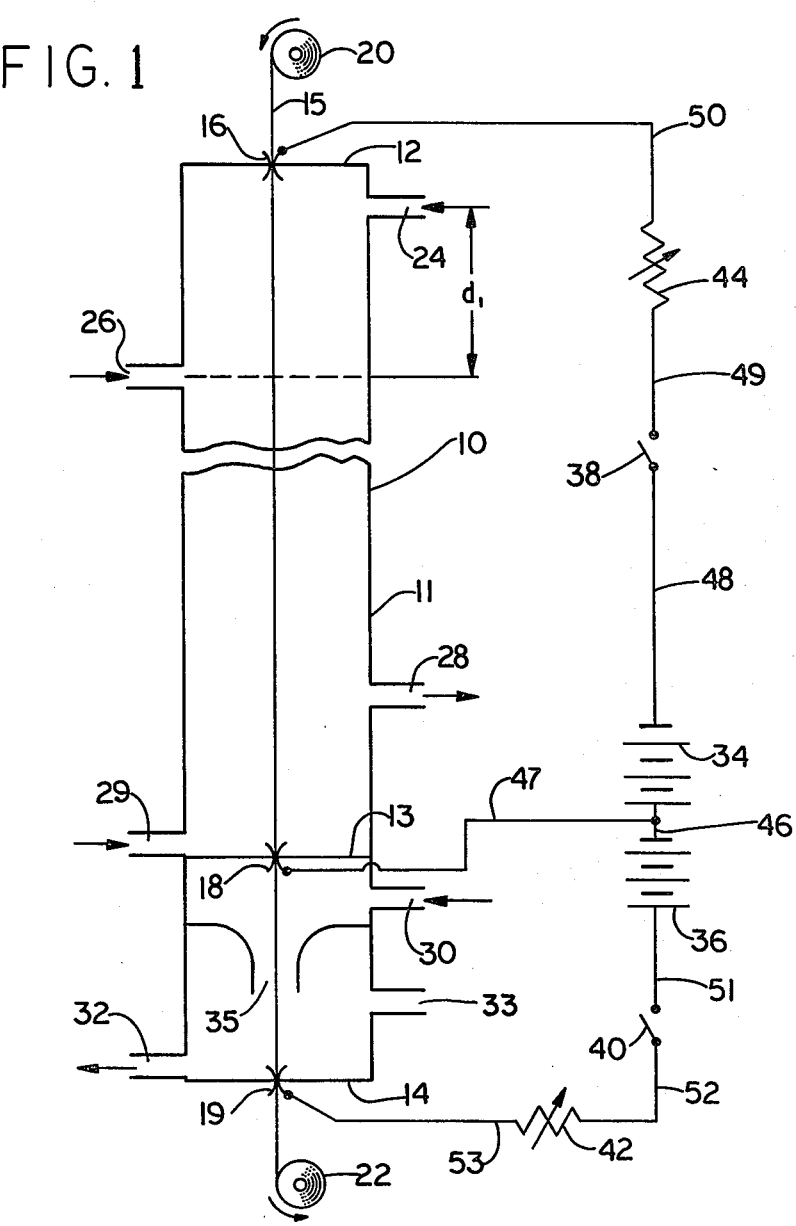
FIG. 1 is a schematic representation of a two-stage reactor for making boronic refractory material coated silicon carbide filament.

FIG. 1 shows in schematic form a two-stage reactor 10 for making boronic refractory material coated silicon carbide filament. The reactor comprises a generally cylindrical member 11 having oppositely disposed closed ends 12 and 14. Partition 13 separates the reactor 10 into upper and lower stages. Filament core 15 is obtained from a supply reel 20. The carbonaceous core 15 passes into reactor 10 through a mercury contact 16 placed in an orifice in the center of end 12. The filament core passes entirely through the reactor exiting therefrom via mercury contact 19 in end 14. Take-up reel 22 stores the filament on which has been deposited the material supplied by the reactor.

SILICON CARBIDE FILAMENT

In making silicon carbide filament according to the teaching of DeBolt et al (U.S. Pat. No. 4,068,037), the carbon core is prepared in a conventional way and fed to the reactor 10 as indicated in FIG. 1. At the top of the reactor at port 24, silane blend, hydrogen, argon and propane are fed to the reactor in quantities to deposit on the core 15 a carbon-rich silicon carbide layer. Some nitrogen and air are also added. At a distance $d_1$ below port 24, additional silane blend and hydrogen are added to dilute the mixture of gases in contact with the core 15 below the port 26.

Normal deposition temperatures, in the range of 2370° F. to 2550° F. are maintained below port 26.

The gases are exhausted at port 28. The silicon carbide filament may be surface-treated by adding propane and argon through port 29 with the deposition temperature in the range 2340° F. to 2550° F.

Typically, reactor 10 might be 2.4 meters long between end 12 and partition 13. The interior diameter of cylindrical member 11 could be 2 cm and the distance $d_1$ equal to 18 cm. Core travel of filament 15 is typically between 7.5 and 10 cm/sec.

The carbon core 15 entering reactor 10 through closed end 12 is raised to the desired deposition temperature by electrical resistance heating. One means of accomplishing this is shown in FIG. 1. Power supply 34 is encircuited by connecting lines 47, 48, 49, and 50, together with switch 38 and variable resistor 44. Connection with filament 15 is made via first mercury contact 16 and second mercury contact 18. By appropriate sizing of the power supply 34 and adjustment of resistor 44, the deposition temperatures can be maintained in the 2370° F. to 2550° F. range stated above.

Figure 2:
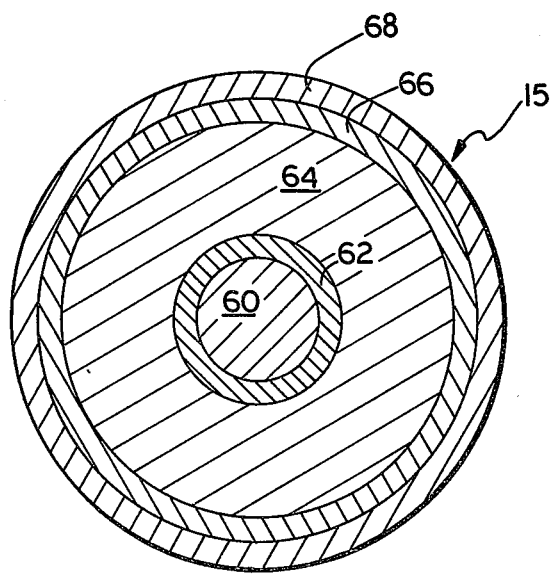
FIG. 2 is a cross-sectional representation of a boronic refractory material coated silicon carbide filament of the type made in the two-stage reactor of FIG. 1.

FIG. 2 shows a cross section of filament 15 as it is wound onto take-up reel 22. Cross-sectional area 60 represents the carbon core as it enters the reactor from supply reel 20. At the top of the reactor, between ports 24 and 26, the carbon-rich layer 62 is deposited on filament 15. Between ports 26 and 28, silicon carbide layer 64 is deposited. Between ports 28 and 29, carbonaceous layer 66 is added. The boronic coating 68 is deposited during the time filament 15 resides in the second or lower stage of the reactor.

Deposition of the boronic coating is accomplished as follows. The filament having core 60 and coatings 62, 64 and 66 is drawn through partition 13, passing therethrough via mercury contact 18. Reactant gases are admitted to the second stage reactor chamber via ports 30 and 33. The reactant gas is removed via port 32. The filament 15 within the second stage chamber is heated to an appropriate temperature by means of power supply 36. Connecting lines 47, 46, 51, 52, and 53, together with switch 40 and variable resistor 42, encircuit power supply 36 with that portion of filament 15 which lies between mercury contacts 18 and 19. For depositing an elemental boron coating, only port 30 is used. Reactant gases are admitted through port 33 as well where a boron carbide coating is desired. The necked down portion 35 is provided to assure that filament 15 sees only the reactants entering port 30 before proceeding through the reactor.

ELEMENTAL BORON COATING

For the deposition of an elemental boronic coating on silicon carbide, the temperature of the filament must be maintained between 1400° F. and 1500° F.

At temperatures below 1400° F., any coating produced is irregular and non-adherent; above 1500° F. there is an adverse interaction with the silicon carbide. Residence times may range from 1 to 60 seconds with about 3 seconds being optimum. The composition of the plating gas for depositing boron nominally corresponds to the stoichiometry of the reaction

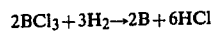

$$2BCl_3 + 3H_2 \rightarrow 2B + 6HCl$$

but may be rich in one or the other reactant relative to the nominal composition. In addition, the reactant mixture may be diluted with an inert or nonreactive gas. The following example illustrates the efficacy of this coating in enhancing the properties of the composites made from coated filament.

Silicon carbide filament with a carbonaceous surface was coated with boron as described above. The deposition temperature was 1450° F., and the residence time was 3 seconds. The gas flows were (in SLPM):

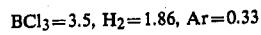

$$BCl_3 = 3.5, \; H_2 = 1.86, \; Ar = 0.33$$

The coated filament was fabricated into a composite of 50 volume percent in 5506 epoxy matrix. Table I shows the mechanical properties of this composite in comparison with one made in the same way, except with carbonaceous surface SiC which had not received a boron coating. Auger analysis of the surface of the coated filament showed a coating thickness of approximately 100 Angstroms ($10^{-8}$ meters).

Table I shows the substantial improvement in all composite properties gained by addition of the boron coating, particularly those which reflect the strength of the filament-matrix bond.

BORON CARBIDE COATING

Boron carbide can also be applied to the silicon carbide filament 15 in a manner similar to that used for the application of boron coatings. The only difference is that the second stage of the reactor must have at least two reactant gas inlets 30.

The reaction by which boron carbide is deposited is nominally (using methane as a source of carbon for illustration)

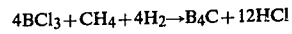

$$4BCl_3 + CH_4 + 4H_2 \rightarrow B_4C + 12HCl$$

corresponding to a reactant gas composition ratio of $H_2:BCl_3:CH_4::1:1:0.25$. Thin boron carbide coatings are deposited onto silicon carbide with compositions within the range between the nominal composition and a hydrogen, boron trichloride, hydrocarbon ratio of 1.0:2.0:0.5. The deposition temperature range is 1800° F. to 2550° F.

The gas ratios are adjusted to optimize the production of boron carbide. It is recognized that there is a series of well-characterized species of carbides of boron, such as $B_4C$ and $B_{12}C_2$, etc. Our judgment is that the boron carbide coating is principally $B_4C$.

TABLE I

Composite Properties of Silicon Carbide/5506 Epoxy Composites

| Property | Uncoated Filament | Boron Coated Filament |
|---|---|---|
| 90° Flexure Strength | | |
| Room Temperature | 12,500 psi | 18,300 psi |
| 350F | 9,020 psi | 11,250 psi |
| 90° Flexure Strength | 7,250 psi | 11,200 psi |
| Strain-to-Failure | 0.25% | 0.46% |
| Shear Strength | | |
| Room Temperature | 13,500 psi | 17,200 psi |
| 350F | 5,230 psi | 9,100 psi |
| 0° Flexure Strength | | |
| Room Temperature | 333,000 psi | 339,000 psi |
| 350F | 183,000 psi | 213,000 psi |

Residence time in the reactor may range from approximately one second to 30 seconds, with 1–5 seconds having been found optimum.

One feature distinguishes the deposition of thin, 1 micron or less, boron carbide coatings from that of other $B_4C$ coatings. The preferred temperature must be maintained at or below 2200° F., in the range from 1800° F. to 2200° F. While higher temperatures adversely affect the properties of the thin coated filament, higher temperatures may be used to produce heavier coatings. The reasons for these effects are not known.

Two features distinguish the deposition of $B_4C$ coatings on silicon carbide from the deposition of $B_4C$ on boron. The first distinction is described in the preceding paragraph. Secondly, as the filament to be coated is first heated to incandescence in the reactor, the reactant gas mixture at that point must be rich in hydrocarbon relative to the overall reaction mixture. This is accomplished by the use of two gas inlets, 30 and 33, the first of which, 30, admits a hydrocarbon-rich gas mixture, and the second of which, 33, admits reactants in such proportion as to achieve the optimum composition for the deposition of the coating.

The coatings produced by this process are in the range from 0.01 to 1 micron in thickness. The advantages to composite properties produced by these coatings are illustrated by the following examples.

EXAMPLE 1

Silicon carbide filament with a carbonaceous outer surface was coated with boron carbide as described above. The residence time in the reactor was 3 seconds at a temperature of 2200° F. The total gas flow at the first inlet was 0.56 LPM of hydrogen, 0.06 LPM of Argon and 0.25 LPM of methane. At the second inlet, the gas flows were 1.0 LPM of $BCl_3$, 1.5 LPM of $H_2$ and 0.38 LPM of $CH_4$. A coating of 0.2 microns thickness was produced. The coated filaments were cast by vacuum infiltration to produce 50 volume percent rods with aluminum 357 alloy as matrix. The rods were 0.150 inches in diameter. Table II shows the mechanical properties of the rods in comparison with those cast from uncoated filaments. The data shows that tensile strengths of composites made from $B_4C$-coated silicon carbide are twice those made from uncoated filament (with a carbonaceous surface).

EXAMPLE 2

Silicon carbide filament with a carbonaceous surface was coated with boron carbide under conditions identical to those in Example 1 except that the methane flow into the second inlet was 0.26 LPM. Coating thickness was 0.2 micron. The coated filament was fabricated into a 50 volume percent composite in 5506 epoxy matrix. Table III compares the mechanical properties of this composite and the properties of a similar composite fabricated from uncoated (carbonaceous surface) silicon carbide. The table shows that every property strongly dependent on filament-matrix bonding was improved when $B_4C$-coated filament was used.

EXAMPLE 3

A sample of silicon carbide filament without a carbonaceous surface was coated as above with boron carbide. Residence time was 6 seconds at a temperature of 2200° F. Gas flows into the first inlet were: $H_2$, 0.56 LPM; Ar, 0.02 LPM; and $CH_4$, 0.64 LPM. Gas flows at the second inlet were: $H_2$, 1.5 LPM; $BCl_3$, 1.0 LPM; and $CH_4$, 0.12 LPM. The coating thickness was approximately 0.3 micron. Before coating, the filament had an average tensile strength of 172 ksi and an average minimum loop diameter of 24.4 mm (surface strength of 344 ksi). After coating, the filament had an average tensile strength of 240 ksi and an average minimum loop diameter of 21.7 mm (surface strength of 387 ksi).

The method for coating boron filaments with boron carbide to protect the filaments from adverse reactions with metal matrices is well-known. Such coatings are typically 5–9 microns thick. Application of boron carbide coatings to silicon carbide filaments using the previously known techniques leads to unacceptable losses of filament strength, for example, a 600 ksi UTS uncoated filament producing a 100 ksi coated filament.

TABLE II

Mechanical Properties of SiC Reinforced Al 357 Castings

| Material | Casting Temperature | Ultimate Tensile Strength High | Ultimate Tensile Strength Low | Ultimate Tensile Strength Average | No. of Tests |
|---|---|---|---|---|---|
| Uncoated SiC | 1220° F.–1270° F. | 134 ksi | 56 ksi | 97 ksi | 32 |
| $B_4C$/SiC | 1230° F. | 236 ksi | 219 ksi | 230 ksi | 3 |
| $B_4C$/SiC | 1165° F. | 231 ksi | 193 ksi | 214 ksi | 4 |

TABLE III

Mechanical Properties of $B_4C$-Coated Silicon Carbide/5506 Epoxy Composites

| Property | Uncoated Filament | $B_4C$-Coated Filament |
|---|---|---|
| 90° Flexure Strength | | |
| Room Temperature | 12,500 psi | 13,770 psi |
| 350 F. | 9,020 psi | 9,380 psi |
| 90° Tensile Strength | 7,250 psi | 9,240 psi |
| Strain-to-Failure | 0.25% | 0.385% |
| Shear Strength | 13,500 psi | 16,030 psi |
| Room Temperature | 5,230 psi | 6,660 psi |

TABLE III-continued

Mechanical Properties of B₄C-Coated Silicon Carbide/5506 Epoxy Composites

| Property | Uncoated Filament | B₄C-Coated Filament |
|---|---|---|
| 0° Flexure Strength | | |
| Room Temperature | 333,000 psi | 300,300 psi |
| 350 F. | 183,000 psi | 213,000 psi |

With our invention, the boron carbide coating is applied to silicon carbide filaments in a reactor having at least two inlets for reactant gases; at the first inlet, corresponding to the point at which the filament first reaches deposition temperature, the injected gases are rich in hydrocarbons relative to the overall reaction mixture. At the second inlet, reactant gases are admitted to bring the composition of the reaction mixture to the desired levels. Residence time in the reactor is between 1 and 60 seconds. The deposition temperature is between 2200° F. and 2550° F., with 2370° F. being preferred.

The following examples illustrate the effects of these coatings.

EXAMPLE 4

Silicon carbide filament with a carbonaceous surface was coated with boron carbide as described above. Residence time in the reactor was 6 seconds at a temperature of 2370° F. The gas flows at the first inlet were $H_2$, 0.56 LPM; Ar, 0.02 LPM; and $CH_4$, 0.9 LPM. The flows at the second inlet were $H_2$, 1.5 LPM; $BCl_3$, 1.0 LPM; and $CH_4$, 0.04 LPM. The coating thickness was 4 microns. The coated filament was fabricated into a 50 volume percent composite in Al 6061 alloy by diffusion bonding at 1000° F. and 5 ksi pressure for 30 minutes. At the same time, a 50 volume percent composite was fabricated in the same way using uncoated (carbonaceous surface) silicon carbide filament. The average longitudinal tensile strength of the composite made with coated filament was 154 ksi, while that from uncoated filament was 89 ksi.

EXAMPLE 5

The filament from Example 4 was also fabricated into a 50 volume percent composite in Al 6061 and Al 4343 alloys (both alloys being present in the same composite) by hot molding at 1140° F. and 400 psi for 10 minutes. Similarly, a composite was made at the same time using uncoated (carbonaceous surface) silicon carbide. The average longitudinal strength of the composite fabricated from coated filament was 90 ksi, while with uncoated filament was 64 ksi.

Our invention has been described in conjunction with the means for coating silicon carbide onto a carbonaceous core. It will be understood that the reactor for depositing a boron or boron carbide coating on a silicon carbide filament can be used alone. Referring to FIG. 1, the boron coating reactor would comprise a cylindrical container capped top and bottom by ends 13 and 14 (Note: separator 13 becomes an end if there is no upper stage). Mercury contacts 18 and 19 both seal the reactor chamber and allow a low resistance contact to filament 15 as it passes through a reactor. A supply reel would furnish the silicon carbide filament to the reactor. Resistance heating of that portion of the filament which extends between mercury contacts 18 and 19 would allow temperature to be raised to the deposition values. Appropriate gases could be circulated through the reactor via inlet ports 30 and 33 and exhaust port 32.

In the alternative, the coating may be deposited by ion plating or another suitable process.

In some usages of our invention it may be advisable to use silicon carbide filament which has a thin carbonaceous coating 66 (See FIG. 2) thereon. In other instances our invention may be used for coating boron or boron carbide directly onto silicon carbide filaments without any layer 66 (See FIG. 2). Our deposition method functions equally well for both cases.

The process parameters can be varied. Departures from the ratios expressed above may be compensated for by varying one or more other parameters.

In the past boronic coatings have been deposited from other halides of boron and even from the diborone $B_2H_2$. These have not proved commercially feasible, though technically feasible.

Also it will be understood that hydrogen is used to provide a reducing reaction environment. Other means may be feasible.

The features and advantages of the invention are thought to be clear from the foregoing description. Various other features and advantages not specifically enumerated will undoubtedly occur to these versed in the art, as likewise will many variations and modifications of the preferred embodiment illustrated, all of which may be achieved without departing from the spirit and scope of the invention as defined by the following claims.

We claim:

1. A high-strength high-modulus filament comprising:
   a silicon carbide filament substrate having applied thereto a coating of boronic refractory material which has been deposited on said substrate heated to a temperature in the range of 1400° F. to 2550° F.

2. The invention as described in claim 1 wherein the boron refractory material is boron deposited on said substrate heated to a temperature in the range of 1400° F. to 1500° F.

3. The invention as described in claim 1 wherein the boronic refractory material is boron carbide deposited on said substrate heated to a temperature in the range of 1800° F. to 2200° F.

4. The invention as described in claim 1 wherein the coating thickness is 9 microns or less.

5. The invention as described in claim 1 wherein the coating thickness for wetting the matrix is less than 1.0 micron.

6. The invention as described in claim 1 wherein the thickness of the coating for use in a cast aluminum matrix ranges from 0.2 to 1 micron.

7. The invention as described in claim 2 wherein the thickness of the coating for use in metal matrix ranges from 0.1 to 9 microns.

8. The invention as described in claim 3 wherein the thickness of the coating for use in metal matrix ranges from 0.1 to 9 microns.

9. The invention as described in claim 2 wherein the coating thickness for wetting a resin matrix is less than 0.1 microns.

10. The invention as described in claim 1 wherein the coating thickness for bonding to a diffusion-bonded or hot-molded metal matrix is 6 to 9 microns.

* * * * *